(12) United States Patent
Harshavardhana et al.

(10) Patent No.: US 6,327,361 B1
(45) Date of Patent: Dec. 4, 2001

(54) MULTIVARIATE RATE-BASED OVERLOAD CONTROL FOR MULTIPLE-CLASS COMMUNICATIONS TRAFFIC

(75) Inventors: Paramasiviah Harshavardhana, Marlboro; Manu Malek, Colts Neck; Kazem Anaraky Sohraby, Lincroft, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/114,645

(22) Filed: Jul. 13, 1998

(51) Int. Cl.$^7$ ........................................ H04M 7/00
(52) U.S. Cl. .................. 379/230; 379/115; 379/137; 379/279; 370/231
(58) Field of Search .................... 379/111, 112, 379/114, 115, 133, 134, 137, 207, 219, 229, 230, 258, 268, 279; 370/231, 410, 426

(56) References Cited

U.S. PATENT DOCUMENTS

| | | | |
|---|---|---|---|
| 4,191,860 | * 3/1980 | Weber | 379/115 |
| 4,497,978 | 2/1985 | Schoute et al. | |
| 4,809,318 | * 2/1989 | Schoute | 379/279 |
| 5,253,248 | * 10/1993 | Dravida et al. | 370/228 |
| 5,291,481 | * 3/1994 | Doshi et al. | 370/230 |
| 5,467,343 | 11/1995 | Lee et al. | |
| 5,479,407 | 12/1995 | Ko et al. | |
| 5,500,889 | 3/1996 | Baker et al. | |
| 5,655,120 | 8/1997 | Witte et al. | |
| 5,719,930 | * 2/1998 | MacDonald et al. | 379/229 |
| 5,754,786 | 5/1998 | Diaz et al. | |
| 5,933,481 | * 8/1999 | MacDonald | 379/137 |
| 5,943,232 | * 8/1999 | Gehi et al. | 700/79 |
| 6,134,216 | * 10/2000 | Gehi et al. | 370/231 |

OTHER PUBLICATIONS

Ozuger et al., Multivariate Rate–based Overload Control for Multimedia Communications Traffic over Hybrid Switch Fabrics, Dec. 1999, Global Telecommunications Conference, 1999, GLO '99, vol. 1a, pp. 344–353, ISBN: 0–7803–5796–5.*

* cited by examiner

Primary Examiner—Fan Tsang
Assistant Examiner—Roland G. Foster
(74) Attorney, Agent, or Firm—William Ryan

(57) ABSTRACT

A method and system for controlling overload at a network processor in a communications system. Messages relating to a plurality of types of calls, functions or processes (collectively, "calls") received at a processor seeking access to processor resources are granted normal access when the delay in processing such messages does not exceed threshold values. When such delay exceeds a threshold, messages are blocked in numbers relating to, among other things, the number of messages allowed in a reference interval, message delay, the total number of blocked calls, the number of blocked calls of each type, the number of calls allowed in one or more preceding intervals and preferences between types of calls.

22 Claims, 3 Drawing Sheets

US 6,327,361 B1

MULTIVARIATE RATE-BASED OVERLOAD CONTROL FOR MULTIPLE-CLASS COMMUNICATIONS TRAFFIC

FIELD OF THE INVENTION

The present invention relates generally to the field of telecommunications systems and methods. More particularly, the present invention relates, in one aspect, to call control treatment systems and methods in telecommunications networks. Still more particularly, aspects of the present invention relate to systems and methods for introducing call controls for processors in applications such as telecommunications networks experiencing overload conditions.

BACKGROUND OF THE INVENTION

Controlling the rate at which calls to one or more designated location(s) are allowed to enter a telecommunications network is often referred to as rate-based control. Such methods introduce call treatment which restrains the number of calls that can be sent from one or more switches (or all switches) in a network to designated locations during a period of time. It has long been a practice in administering telecommunications networks to provide call blocking methods under conditions of system or processor overload. For example, techniques are sometimes applied to call-in numbers for radio or TV call-in shows that experience a concentrated volume of calling in response to contest offers or celebrity appearances.

Other cases suitable for overload control countermeasures arise when fires, severe weather or other crisis conditions impose great demands on a communications network for calls originating and/or terminating at a particular switch or in a particular geographical region. The importance of throttling techniques is clear in modem processor-based switches and other network elements. If unchecked surges of demand persist for too long, the result can be a halt of operation of the processor and total shutdown.

In modem networks one typical approach in applying throttling techniques is to have traffic-sensitive controls imposed by messages sent from a network management control center or similar network facility to individual switches. Such a network management control center may include an administrative control station receiving traffic monitoring data, which data can be acted on by a control center operator. For example, a network management control center operator receiving information about unusual calling volumes to a particular number, group of numbers or switching location can cause a control instruction to be sent to selected switches, or all switches, in the network to block or otherwise inhibit additional traffic destined for the overloaded switch or group of switches.

As an example, call treatment imposed by network administration personnel in the face of unusually high calling volume to a particular switch may be applied to all switches in the network. The call treatment imposed on network switches may, for example, be such that originating volume directed to the high-volume switch (or a number or group of numbers at one or more switches) may be limited to a defined number of calls per unit time (e.g., seconds or minutes). While actions taken will vary, e.g., depending on the call treatment options available, the person or mechanism sending a control instruction may designate that blocked calls receive either an "all circuits busy" announcement, or a busy signal.

In addition to the manual imposition of call controls by call control messages sent from network management personnel to switches, it is well known in the art to use network databases, e.g., service control points or SCPs to automatically send such messages. In particular, these call treatment messages can be associated with messages sent in response to queries from a switch for database information, e.g., 8xx-to-POTS (Plain Old Telephone Service) number translation information. Such call treatment information and direction to be imposed by SCP messages in some cases is formed at a service management system (SMS) associated with one or more SCPs, and passed to the SCPs for use in responding to subsequent queries. Processor-based network nodes (e.g., switches) commonly interact with other nodes (e.g., other switches and SCPs), and provide useful output in response to one or more messages for each call. Typically, these messages are routed through a signaling network, such as signaling system 7 (SS7) networks in response to call requirements.

Processors appear in telecommunications networks in many applications; the cited voice call switching and SCP-based intelligent network 8xx voice calls are merely among the most common. Database processors appear in many modem telecommunications networks to provide a wide range of voice and data applications. ATM and other data packet- and cell-switches, routers, bridges and many other processor-based systems help provide voice-band and wide-band applications.

Increasingly, telecommunications systems are called on to provide various levels of guaranteed service. Emergency calls, such as the ubiquitous 911 calls, have long been afforded priority treatment in the face of processor overload. Additionally, in many data networks, differing services are provided under respective quality of service (QoS) guarantees. Determining throttling strategies is more complex in the case of multiple call types because, inter alia, the quantity of required call processing resource may be different for each call type. Of course the mix of calls of each class that arrive at a processor that is in, or approaching, overload will typically vary with time as well.

When call treatment is to be imposed because of overload at a data switch processor, e.g., it becomes important to impose these call treatments in such manner as to avoid or minimize violations of agreed-upon level of service guarantees. Even without express QoS goals, an appropriate balance often must be maintained for calls of different types or classes. For example, in circuit switch networks where 800 and residential calls are supported, it is important that the total throughput from both calls is maximized. It is desirable to detect overload using indicators such as signaling message delay inside the system, and take actions such as traffic throttling based not only on indicator values, but also on call blocking criteria appropriate to various type calls supported by the system.

While many solutions have been attempted to avoid processor or system overload in the course of seeking to maximize useful throughput in a telecommunications system, success has been mixed. For networks handling only a single call type, overload control has usually been based on throttling traffic before it enters the communications processor. This throttling has taken many forms: for example, accepting calls only with a pre-determined probability or only within certain time intervals.

These and many other methods typically seek to maximize system throughput by reducing the interaction of calls or messages that are already inside the system, thereby allowing processor capacity to be dedicated to perform "useful" work. Useful work contributing to system "goodput" is measured as the rate of calls or messages that complete their functions within a specified time interval and/or with other desirable performance characteristics. Some prior art solutions have proven valuable under particular circumstances and for particular types of calls or messages, but none have been found to be applicable to the full range of overload conditions encountered in processor-based telecommunications systems handling different call classes.

SUMMARY OF THE INVENTION

Limitations of the prior art are overcome and a technical advance is made in accordance with the present invention, as described in illustrative embodiments herein. Inventive rate-based control methods and systems are, in typical embodiments, based on several important characteristics that collectively contribute to system goodput.

In one illustrative embodiment, network controls are applied in a flexible manner to reduce processor overload in response to determinations made at the overloaded processor. More specifically, in accordance with one illustrative embodiment of the present invention, it proves advantageous to monitor delay times encountered by messages sent to a processor, and to formulate control triggers based on presented probabilities of blocking for classes of potentially affected calls. These control triggers are acted on locally at the processor location in some cases. In other cases, messages formulated in response to the triggers are sent to other locations for further remedial action. Such other locations include other network nodes and, in some cases, one or more network management control centers.

Importantly, aspects of the present invention provide systems and methods for overload control when multiple classes of calls are presented to a call processor. These inventive solutions are multivariate in that message delay and the number of calls blocked are used to control the rate of calls entering the system. Message delay continues as a useful overload indicator. Thus, in accordance with another aspect of the present invention, throttling of calls and other demands (e.g., translation or other queries) are selectively modulated depending on the type of call or other request for resources, as by providing different blocking rates to each type of call. In addition, measurements of rates of arrival/completion in the system contribute strategically to embodiments for limiting new calls/messages to the system.

Processors are better able to handle the calls/messages with acceptable characteristics when suppression of demand for processor resources is accomplished using the present equitable multivariate methods and systems.

BRIEF DESCRIPTION OF THE DRAWINGS

The above-summarized illustrative embodiments of the present invention will be more fully understood in light of the following detailed description and the included drawing, in which.

DETAILED DESCRIPTION OF THE INVENTION

Figure 1:
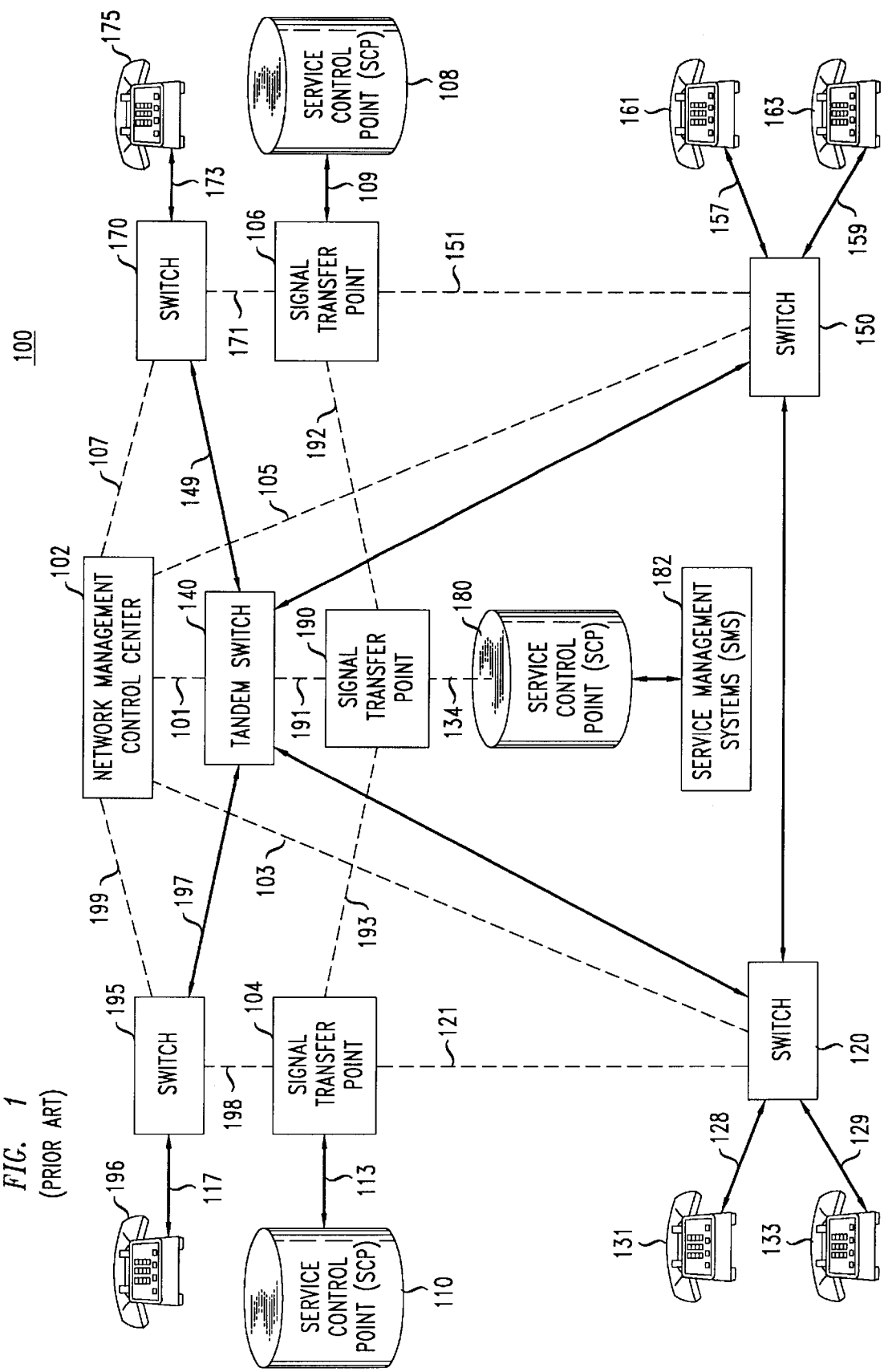
FIG. 1 is a block diagram of a typical telecommunications network in which illustrative embodiments of the present invention may be practiced.

FIG. 1 shows a simplified block diagram of a typical telecommunications system in which illustrative embodiments of the methods of the present invention may be practiced. Telecommunications system 100 of FIG. 1 comprises, for illustrative purposes: network management control center 102; signal transfer points 104, 106 and 190; network databases 110, 108 and 180; central office switches 120, 150, 170 and 195; and tandem switch 140. Switches 120, 150, 170 and 195, through referred to as central office switches, should be understood to include common channel signaling (CCS) capabilities, or be connected through CCS-capable switches for purposes of providing such functionality on behalf of the indicated switches. In any event, the switches 120, 150, 170 and 195 are able to send and receive CCS messages (or have CCS messages sent and received on their behalf) to other network entities. For convenience of further explanation, it will be assumed that these switches include CCS capabilities, i.e., they are what are sometimes referred to as service switching points or SSPs.

Network management control center 102 monitors telecommunications system 100, and is interconnected to central office switches 120, 150, 170 and 195 via links 103, 105, 107 and 199, respectively. Signal transfer points (STPs) 104, 106 are interconnected to each other (illustratively through signal transfer point 190 and interconnecting signaling links 192 and 193) and to respective data bases 110 and 108. STPs 104 and 106 are also connected to each switch in telecommunications system 100, via signaling links and intermediate STP 190. More particularly, signal transfer point 104 is interconnected to network database 110, and central office switch 120 via signaling links 113 and 121, respectively. STP 104 is also connected to tandem switch 140 via signaling links 193 and 191, and intermediate STP 190. STP 104 is connected to switch 195 via signaling link 198. Similarly, signal transfer point 106 is interconnected to database 108 via signaling link 109 and to central office switch 150 via signaling link 151. STP 106 is also connected to switch 170 via signaling link 171 and tandem switch 140 via signaling links 192 and 191 via intermediate STP 190.

Database system 180 shown connected to STP 190 in FIG. 1 illustratively assumes the form of a service control point (SCP) 180 and has associated with it service management system (SMS) 182. SCP 180 is representative of network databases for supplying routing and other control information for database-based services such as calling card, 8xx, 900, virtual private networks and other intelligent network or Advanced Intelligent Network (AIN) services. Queries are launched by switches and other network elements and arrive at SCP 180 seeking additional information needed to process this class of calls. Messages are typically received at SCP 180 via signaling link 134 in SS7 TCAP common channel signaling format and result in access to the network database located at the SCP. Upon retrieval of needed information, the SCP then sends one or more messages to the querying network element or other network elements to further process the call. Among the capabilities of modern SCP databases is call treatment in light of congestion or other overload, e.g., call blocking or call gapping. U.S. Pat. No. 4,191,860 issued Mar. 4, 1980 to Roy P. Weber provides a discussion of call blocking using traffic information available at a network database when, for example, a particular number is very frequently called in a short period of time. Service management system (SMS) 182 is commonly used in conjunction with network databases, e.g., for service creation and provisioning, and can be used to modify call treatment policies and practice for particular numbers, groups of numbers and NPA-NXX numbers.

Telecommunications system 100 depicted in FIG. 1 is only a representative portion of a network such as the public-switched telephone network (PSTN). Those skilled in the art will recognize that many other switches and interconnected STPs are present in the complete PSTN. Likewise, databases 108 and 110 shown in FIG. 1 are merely representative of databases now used in telecommunications networks. What is common to the switching and database systems in the illustrative network of FIG. 1 is that they are all processor-based, i.e., they each have processors for receiving and interpreting messages of various kinds and for making determinations (routings, credit authorizations, etc.) for actions to be performed either at the same network node (such as switches) or at another node in response to messages sent in response to these determinations. For illustrative purposes, the example network of FIG. 1 is primarily a representative portion of the public switched telephone network (PSTN), but application of the principles of the present invention are not limited to application in such networks. Thus, for example, processor based nodes may in some applications include data switches, routers or other instrumentalities for receiving, processing and transmitting data. Interconnecting signal and signaling paths may be wire paths, optical fiber paths or wireless paths, among others. While shown separately in the system of FIG. 1, it should be understood that signal and signaling paths may be part of the same physical path or conduit or frequency band.

Likewise, while the messages referred to in the foregoing discussion of the illustrative network of FIG. 1 are TCAP or other signaling system 7 (SS7) messages of standard types, it should be understood that no particular form of processor, nor any particular form of signaling message is required for any or all applications of the present inventive teachings. In particular cases the "signaling" information may form part of a datastream received at a processor-based data switch or other network element. Features of embodiments of the present invention relate to the manner in which overload is recognized at a processor and how overload conditions are advantageously dealt with. The method of transmitting and receiving messages related to the overload treatment is not limited to any particular method.

In the illustrative network shown in FIG. 1, central office switch 120 is interconnected to tandem switch 140 via bidirectional trunk 143, and is interconnected to central office switch 150 via established bi-directional trunk 169. Tandem switch 140 is interconnected to central office switches 150, 170 and 195 via established bidirectional trunks 145, 149 and 197, respectively. While the foregoing trunk interconnections are stated in terms of trunks, it will be appreciated by those skilled in the art that such interconnections may include one or more trunk groups, as traffic demands dictate.

While each of the central office switches shown in FIG. 1 may have a unique NPA-NXX designation, tandem switch 140 does not serve individual customer lines, and is not identified by such an NPA-NXX code. Tandem switch 140 acts as a gateway switch to other switches within representative telecommunications system 100, and the PSTN generally. Illustrative tandem switch 140 shown in FIG. 1 typically comprises a main processor interconnected to a trunking facility and a memory for storing control information and processes, including call control information. Such call control information will include call treatment information received from network management control center 102, derived at switch 140 based on locally observed traffic activity, or received from other network elements. Tandem switch 140 will illustratively act on such call control information to impose call treatments needed to selectively inhibit calls for identified destinations.

In an illustrative system embodiment, central office switches 120, 150, 170 and 195 are 5ESS® switches manufactured, and sold by Lucent Technologies Inc. In aspects useful to a practice of present inventive embodiments, these latter switches will advantageously include elements substantially equivalent to those recited above as typically included in tandem switch 140.

Network databases 110, 108 and 180 normally are not associated with any particular user identification such as an NPA-NXX. Rather such databases are typically used as network or application resources accessed when its capabilities are required. Nevertheless, the processor(s) and storage facilities, as well as any applications programs or other resources at such network databases can be subject to overload, just as switch processers are.

During normal operation of telecommunications system 100, substantially all calls placed between customers served by central office switches 120, 150, 170, 195 and other switches within the PSTN are completed. In some circumstances, however, it is necessary to decrease the call volume directed to a particular destination. For purposes of example, assume that natural disaster strikes the geographic area served by central office switch 150. As a result, concerned parties wishing to contact friends and relatives in the affected area place calls directed to central office switch 150. Simultaneously, those parties served by central office switch 150 may attempt to place outgoing calls to the concerned parties. To optimize switch resources for completing as many calls as possible, network management personnel institute a call blocking control directed to relieving demand on resources at central office switch 150. In alternative embodiments, call-blocking controls can be activated for other destinations, such as a plurality of central office switches or a particular directory number.

In the current example, the call blocking control is intended to limit the number of telephone calls that are directed to central office switch 150. More particularly, assume that network management personnel want to allow only ten calls per minute originating at switches 120, 170 and 195 to terminate to a customer line on central office switch 150. During normal operation (that is, without call blocking controls), the call origination rate at switches 120, 170 and 195 for calls directed to switch 150 may be as high as 50 calls per minute, or more. The requirements of the call blocking control are advantageously formulated in network management control center 102, and downloaded to all affected switches in telecommunications system 100 via datalinks 101, 103, 105, 107 and 199. In the illustrative embodiment, the call blocking control accommodates ported directory numbers, as described below. Once received at a central office switch, the call blocking control is stored, e.g., in respective switch module memories. In tandem switches, such as tandem switch 140 in FIG. 1, the call blocking control is stored in illustrative data memory. The central office switch which is experiencing overload or other difficulty (in this case, central office switch 150) also may receive the call blocking control, but may receive a different control (such as, allowing a given number of calls per unit time to originate from its customer lines). Call blocking controls can significantly decrease call volumes destined for a central office switch, such as the assumedly overloaded switch 150. For purposes of the above discussion it has been assumed that only one class of calling has been involved. Before treating the present inventive embodiments of the present invention, it proves convenient to establish relevant system parameters useful in effecting equitable throttling treatment when a plurality of call classes are involved.

System Parameters

System parameters and related analytical aspects of the present inventive embodiments are viewed in terms of activities at a processor at a network node, such as a switch or network database shown in FIG. 1. Without loss of generality, it will be taken that the number of different kinds of services (or the types or classes of calls) provided by a node processor is two. It can be shown that the principles and techniques presented below can readily be generalized to numbers greater than two.

It proves convenient to establish time intervals, each of length $\tau$ seconds, and to establish a counter set at $N^n$ at the start of each interval n. The duration $\tau$ of the interval depends on the capacity of the communications processor for which overload control is devised and on other design considerations, such as volatility of demand for processor resources. Example values of $\tau$ can range from several milliseconds to seconds, or minutes (i.e., multiples of 60 seconds). Associated with the counter $N^n$ are two other counters, one for each type call (illustratively type i, with i=1 and 2). These counters are set to $N_i^n$, i=1, 2 at the beginning of each interval n. Values for $N_i^n$ will be determined such that $$N^n = \sum_i N_i^n$$

for all n.

Two sets of objectives are assumed for the system: time delay for messages that are handled by the system (denoted by $T^*$), and respective probabilities of blocking for the calls, $p_i^*$, i=1, 2. The delay objective means that message delay inside the system should be limited to $T^*$ most of the time, and that the system should be able to control its performance under overload with this objective in mind. Probability of blocking objectives $p_i^*$ imply that under overload the system seeks to achieve $p_i^*$ as its probability of blocking for type i calls. Thus, in this type of overload control system, both message delay and probability of blocking are used as constraints for achieving control under overload while avoiding poor processor performance, such as low throughput under overload conditions.

Two sets of measurements that can usefully be performed during the control interval $\tau$ are:

$NB_i^n$: Number of calls blocked over interval n for type i calls, i=1, 2.

$T^n$: Measured message delay in the system over interval n. In performing delay measurements, it is assumed that inside the system all message types are treated identically—no distinction between them is made.

It proves useful to introduce the following system variable:

$N_i^{min}$: Minimum number of type i calls allowed over an interval, other than when allocation is used by other type calls. No assumptions about maximum number of calls that can be accepted over an interval are made. This system and method are therefore adaptable and upgradeable, i.e., no operational change is needed if system capacity is increased, as by upgrading the processor to a higher capacity. The choice of $N_i^{min}$ does not require exact performance measurements of the target process, though an appropriate choice of $N_i^{min}$ should be made on the basis of requirements or on experience with experimental values. Note that $$N^{min} = \sum_i N_i^{min}.$$

The calculation of $N^n$ and $N_i^n$ depend on $T^n$, $NB_i^n$ as well as $N_i^{n-1}$. In principle, $N^n$ is determined on the basis of measured values of delay over the intervals (indicated as T). In practice, it often proves advantageous to average, or otherwise filter, values of $T^n$ over several n values. In the following, an example algorithm leading to a determination of $N^n$ is given. Other particular algorithms based on particular variations of delays, numbers of blocked calls and the like will occur to those skilled in the relevant arts in light of the present discussion. Thus, for interval n if $T > T^*$ $$\text{Let } N^n = \max\left\{N^{min}, N^{n-1} \cdot \frac{T^*}{T}\right\}$$

if $T < T^*$ $$\text{Let } N^n = N^{n-1} \cdot \frac{T^*}{T}$$

if $T = T^*$ then:
$N^n = N^{n-1}$.

So, if measured message delay is greater than the objective $T^*$, then $N^n$ is reduced, but not to less than $N^{min}$. Similarly, if T is less than the objective, then $N^n$ is increased. Finally, if measured delay meets the objective, the value for $N^n$ is maintained.

Now that the counter value $N^n$ representing total calls of type 1 and 2 that can be admitted to the system over interval n is known, a method will be presented that breaks $N^n$ into its components $N_i^n$ such that:

$$N^n = \sum_i N_i^n \text{ all } n.$$

Again for simplicity of presentation, the case of two call types (i=1, 2) will be treated. As will be clear to those skilled in the arts, the method can be readily extended to the general case where i=1, 2, . . . , M.

It proves convenient to employ a variable $Q_i^*$ to represent the average number of calls of type i that may be blocked over the period $\tau$. $Q_i^*$ can, for example, be determined from $p_i^*$, $\tau$, and, in appropriate cases, other system parameters. As an example, $Q_i^*$ can be taken to be equal to $\alpha p_i^* \tau$, where $\alpha$ is a numerical value chosen for a particular systems and operations conditions. In any event, $Q_i^*$ is a blocking count objective based on blocking probability $p_i^*$.

There are four relevant cases:
Case 1: $Q_1^* < NB_1^{n-1}$, $Q_2^* < NB_2^{n-1}$
Case 2: $Q_1^* < NB_1^{n-1}$, $Q_2^* \geq NB_2^{n-1}$
Case 3: $Q_1^* \geq NB_1^{n-1}$, $Q_2^* < NB_2^{n-1}$
Case 4: $Q_1^* \geq NB_1^{n-1}$, $Q_2^* > NB_2^{n-1}$ In the following, algorithms to determine $N_1^n$ and $N_2^n$ are presented in sufficient detail to permit those skilled in the relevant arts to practice the invention. As was the case for values of $T^n$, it sometimes proves advantageous to use averaged or otherwise filtered values of $NB_i^{n-1}$ in treating the four identified cases. Similarly, $N_i^{n-1}$ values shown in the expression below can be filtered values of the exact values. In all cases and sub-cases cross-usage of counter values allocated to various call types may be used. Each of the above 4 cases may have several sub-cases:

Case 1:

Case 1(a): If $N^n > N^{n-1}$, let $\Delta N = N^n - N^{n-1} > 0$

Then: $N_1^n = N_1^{n-1} + \frac{N_1^{n-1}}{N_1^{n-1} + N_2^{n-1}} \cdot \Delta N$ $N_2^n = N^n - N_1^n$ Case 1(b): If $N^n > N^{n-1}$, let $\Delta N = N^n - N^{n-1} < 0$ Let $\Delta_1 = \Delta N \cdot \frac{N_1^{min}}{N_1^{min} + N_2^{min}}$, $\Delta_2 = \Delta N \cdot \frac{N_2^{min}}{N_1^{min} + N_2^{min}}$ Then: $N_1^n = \max\{N^n - \Delta_1, N_1^{min}\}$
$N_2^n = N^n - N_1^n$ Case 1(c): If $N^n = N^{n-1}$
Same algorithm as case 1(b) above.

Case 2:

Case 2(a): If $N^n > N^{n-1}$, let $\Delta N = N^n - N^{n-1} > 0$
Then: $N_1^n = N_1^{n-1} + \Delta N$
$N_2^n = N_2^{n-1}$ Case 2(b): If $N^n < N^{n-1}$, let $\Delta N = N^n - N^{n-1} < 0$
Then: $N_1^n = \max\{N_1^{min}, N^n - N_1^{min}\}$
$N_2^n = N^n - N^n$ Case 2(c): If $N^n = N^{n-1}$
Same algorithm as case 2(b) above.

Case 3: In this case, the algorithm is identical to Case 2. Only the subscripts 1 and 2 need be switched.

Case 4:

Case 4(a): If $N^n > N^{n-1}$, let $\Delta N = N^n - N^{n-1} > 0$
Case 4(aa): If $NB_1^{n-1} = 0$, and $NB_2^{n-1} = 0$ Then: $N_1^n = N_1^{n-1} + \frac{N_1^{n-1}}{N_1^{n-1} + N_2^{n-1}} \cdot \Delta N$ $N_2^n = N^n - N_1^n$ Case 4(ab): If $NB_1^{n-1} = 0$ but $NB_2^{n-1} > 0$
Then: $N_1^n = N_1^{min}$ and $N_2^n = N^n - N_1^n$ Case 4(ac): If $NB_1^{n-1} > 0$ but $NB_2^{n-1} > 0$
Then: $N_2^n = N_2^{min}$ and $N_1^n = N^n - N_2^n$ Case 4(ad): If $NB_1^{n-1} > 0$, and $NB_2^{n-1} > 0$ Then: $N_1^n = N_1^{n-1} + \frac{NB_1^{n-1}}{NB_1^{n-1} + NB_2^{n-1}} \cdot \Delta N$ and: $N_2^n = N^n - N_1^n$ Case 4(b): If $N^n < N^{n-1}$, let $\Delta N = N^n - N^{n-1} < 0$
Case 4(ba): If $NB_1^{n-1} = NB_2^{n-1} = 0$ Then: $N_1^n = N_1^{n-1} + \frac{N_1^{n-1}}{N_1^{n-1} + N_2^{n-1}} \cdot \Delta N$ and $N_2^n = N^n - N_1^n$ Case 4(bb): If $NB_1^{n-1} = 0$, but $NB_2^{n-1} > 0$ Then: $N_1^n = N_1^{min}$
Let $N_2^n = N^n - N_1^n$ Case 4(bc): If $NB_1^{n-1} > 0$, but $NB_2^{n-1} = 0$
Let $N_2^n = N_2^{min}$
$N_1^n = N^n - N_2^n$ Case 4(bd): If $NB_1^{n-1} > 0$, $NB_2^{n-1} > 0$ Let $\Delta_1 = \frac{N_1^{min}}{N_1^{min} + N_2^{min}} \cdot \Delta N$ and: $\Delta_2 = \frac{N_2^{min}}{N_1^{min} + N_2^{min}} \cdot \Delta N$ Then: $N_1^n = \max\{N^n - \Delta_1, N_1^{min}\}$
$N_2^n = N^n - N_1^n$.

Illustrative Node Structures

Figure 2:
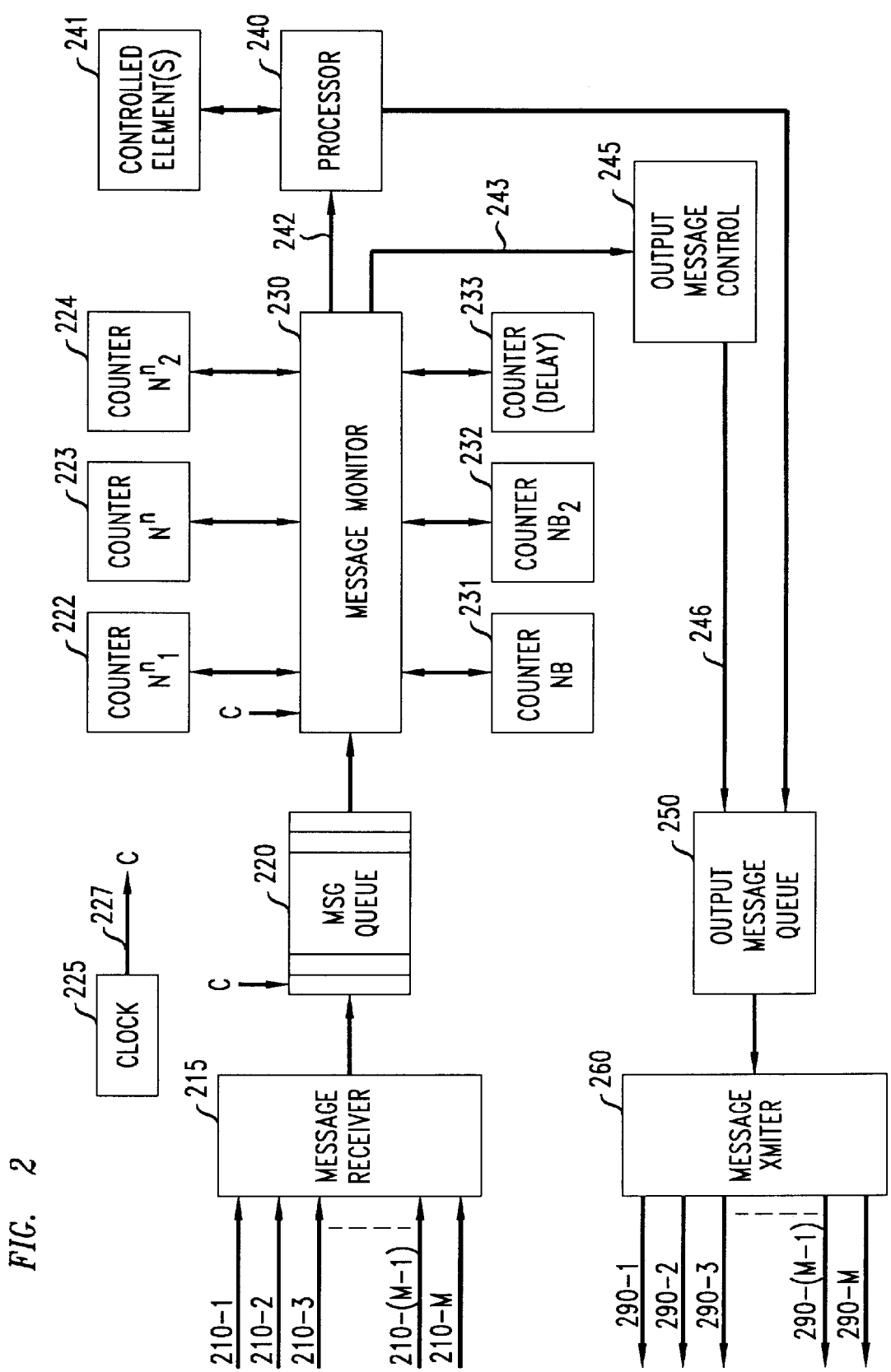
FIG. 2 is a more detailed block diagram representation of a processor-based node in a network of the type shown in FIG. 1.

FIG. 2 shows an illustrative circuit arrangement for implementing call controls at a node in a network such as that shown in FIG. 1, and for communicating status information to other nodes in the network, including one or more network management control centers. The character of the node is not central to the use of embodiments of the present invention, and may be a switch, network database or other processor-based node.

In FIG. 2 the processor 240 is shown connected to the controlled element(s) 241. As noted, the processor may be used to control one or more switching elements at a switch, such as the illustrative 5ESS switch cited above. Alternatively, controlled element(s) 241 may comprise one or more bulk memory structures along with special purpose application software for realizing desired database functions, such as are used in intelligent network services or for other network functions.

Also shown in FIG. 2 are message receive element 215 (having an illustrative plurality of message inputs 210-1 through 210-M), and message transmitter 260 (having illustrative message outputs 290-1 through 290-M). These two elements are representative of the signaling or other message inputs typically used to send and receive control, query and other non-user-content information. In a typical case elements 215 and 260 (along with their respective inputs and outputs) represent the SS7 signaling links to the network. Messages received at message receiver 215 are typically queued in standard fashion for delivery to processor 240. It is the delay encountered by these input messages that is illustratively used to indicate a state of overload or the lack thereof.

As one illustrative technique for measuring delay encountered by messages received at the example node of FIG. 2, a clock circuit 225 provides a timestamp output on lead 227, labeled "C." The timestamp signals appearing on lead 227 are advantageously provided as an input to message queue 220 to indicate the time of arrival. In similar manner the C signals are applied to message monitor circuit 230. When a particular message has passed through the message queue 220 and is ready for application to the processor 240, a then-current timestamp is illustratively used to measure the time the message has spent waiting in the queue. This is advantageously found as the difference between the time stamp as the message was input to the queue and the time it emerges from the queue. A value representative of the delay or queuing interaval is then available for storage in a counter (in this case, counter 233) for use as discussed above in establishing the state of overload at the processor.

In normal operation of the node in the absence of overload, messages are received and promptly passed to processor 240 for whatever processing is required. If the message concerns some activity to be accomplished at the controlled element 241, e.g., a database operation, directions to accomplish such functionality are sent by the processor to the relevant system (such as bulk memory). In such operations, the database system or other controlled element may respond with routing or status information, among many other possibilities. This information is typically packaged at the node by the processor 240 or some adjunct to the processor (as is well known in the art) and is delivered to message transmitter 260 for delivery over one or more of its output links 290. In normal operation, such messages may be queued in output message queue 250 while awaiting transmission. In the assumed normal operation of the network node, the value of delay encountered by received and transmitted messages is reflective of the operation of processor 240 within its desired design limits; no overload exists.

If, however, messages arrive at a high level for sustained periods the contents of received message queue 220 will increase and the processors ability to process them in a timely manner may be impaired. A similar condition may arise when the processor is called on to perform a mix of operations having higher than expected average complexity. Of course malfunctioning at the node can produce a similar inability of the processor to keep up with the demands for processing reflected by the incoming message stream. Thus, counter 233 reflects longer delay times and the above-described determinations of $N^n$ and $N_1^n$. Counters 222, 223 and 224 are used to register the values for $N^n$ (223) and for $N_i^n$ (222 for i=1, 223 for i=2). When overload conditions exist and call blocking is imposed, counters 231 and 232 register the number of blocked calls for the two illustrative types (231 for type 1 calls, 232 for type 2 calls).

Ouput message control circuit 245 represents the control circuitry and operations arising from a determination that overload exists at processor 243. Thus, when counter 233 indicates a greater than desired delay, thereby triggering blocking subject to the number of calls (or other functions indicated by received messages) of each type. Since a determination is made at message monitor 230 as to the state of delay and the count in the various counters, message monitor advantageously performs the call (or other finction) blocking, either completely at the node, or by sending of messages to other nodes or to the network management control center. Thus, under the control of determinations made at message monitor circuit 230, output message control circuit 245 causes status messages, including call gapping or other call treatment messages to be sent.

Depending on the nature of the controls to be effected (such as restricting the number of calls sent to the node experiencing overloaded processor conditions), and the permissions granted by network administrators, the messages may be directed to particular high rate sources of message traffic. Thus, if the node with the overloaded processor receives a large proportion of its messages from a single other node (or a small set of nodes), the network administrator may grant authority to send throttling messages directly to the source of the originating messages. In other cases, messages formulated through determinations at the overloaded node will be sent to the network management control center (or similar management node) for further action. The network management node is well positioned to send controlling messages to other network nodes to ease the load on the overloaded processor node, as was discussed above.

Blocking at the overloaded node may also be accomplished in combination with controls imposed at other network nodes by the network control center or by messages sent directly or indirectly from the overloaded node. In the absence of authority to throttle other nodes, directly or otherwise, and without controls being imposed on such other nodes by network management, the overloaded node will continue to block calls and other functions relating to received messages.

It proves useful to have information about the number of calls blocked by action of messages from the network management node to other network nodes (or directly from messages from the overloaded node) sent to the overloaded node. Therefore, messages reflecting the number of messages blocked in particular periods are advantageously sent from the throttled nodes to the overloaded node to allow further adjustments at the overloaded node. Thus, if a particular overload proves to be transient, then appropriate restoration of more normal operating conditions will be effected when the overload conditions moderate.

It will be appropriate in some cases to have the network management node receive blocked-message reports from the throttled nodes so that blocking instructions can be modified. This can be accomplished by having the network management node 102 in FIG. 1 assemble information respecting blocking conditions at throttled network nodes and notifying the overloaded node by a single or reduced number of consolidated message. In cases of considerable overload at a particular node, this latter approach will ease the message-handling needs of the overloaded node.

Figure 3:
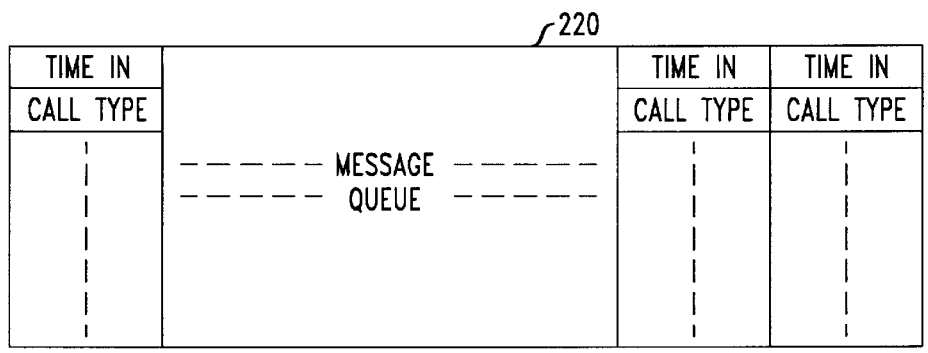
FIG. 3 is a representation of a message at a node of the type shown in FIG. 2 and including additional call control fields useful in implementing aspects of a process to control calls.

FIG. 3 is a representation of message queue 220 containing a number of received messages. As will be seen in that figure, it proves convenient to include an express augmentation of the time of arrival with the received message. In the above-described multivariate input scenario, it proves convenient to also include an express recitation of the call (or other function) type associated with the message. In some cases, of course, received message already include sufficient information about the type of call or service associated with the message.

Illustrated Overload Processing

Figure 4:
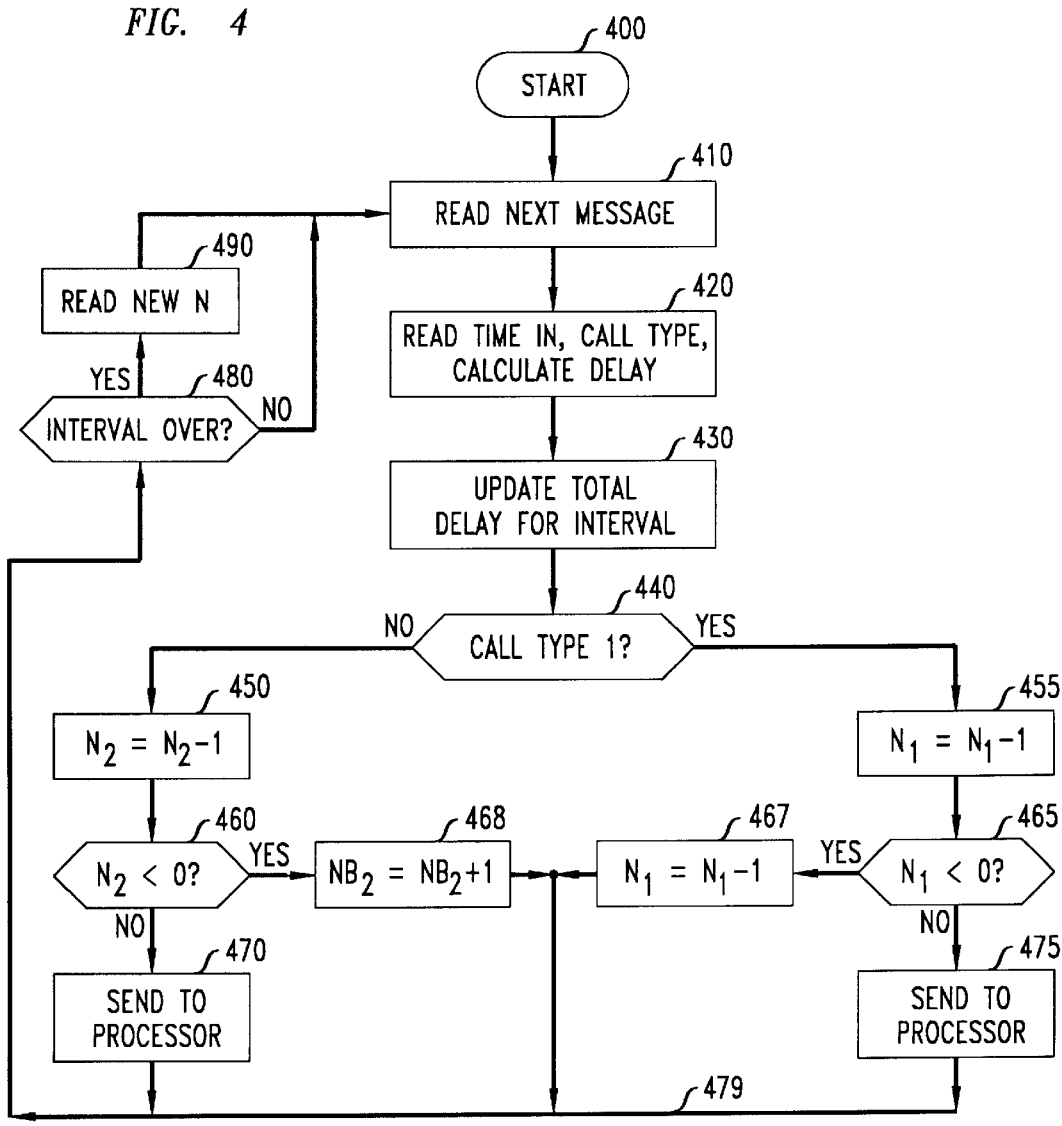
FIG. 4 is a flow diagram illustrating steps performed by a processor at a node of a network of the type shown in FIG. 1 in accordance with aspects of illustrative embodiments of the present invention.

FIG. 4 is a flowchart presenting an example of call treatment determination made in accordance with an illustrated embodiment of the present invention for a node experiencing processor overload. The operations detailed in FIG. 4 are typical of those carried out in the manner described above in connection with FIG. 2. While FIG. 2 and the description of it present above speak in terms of message queues and control circuits and the like, it should be understood that some or all of the operations described in connection with FIGS. 2 and 4 may be carried out using a program controlled processor. Thus, e.g., the counters referred to need not be separated hardware counters, but may instead be counts made, incremented and stored in memory of a general or special purpose processor.

Beginning with the START block 400 in FIG. 4, the first operation shown is that of reading a message from the queue from message queue 220. Then, the TIME IN and CALL TYPE fields are examined at step 420 to permit the determination of delay for the current message. As noted earlier, delay for a single message (or for an adjacent group of messages) may not be the best determinating factor for measuring actual stress on the processor. Rather, some average or other filtered version operative over a longer interval (perhaps several 1-second periods) may be used. Thus, the operations at step 430 may produced only one reading to be combined with others to develop a measure of load on the processor.

In any event, at step 440 a determination of the kind of call (or other function to which the message relates) is made.

For simplicity, the types are restricted to two, as note above. If the call is of type 1, step 455 is performed, causing a decrementing of the current value of $N_1$, the number of calls of type 1 that may be processed in the current 1-second period. This value is originally set to $N_1^n$ at the beginning of the period. A test is made at decision block 465 as to whether $N_1$ is less than zero. If the test at block 465 is negative (not all of the allowed type 1 calls for the present interval have been processed), then the message is sent to the processor over path 242 in FIG. 2. If the test at block 465 yields a positive result (meaning all of the allowed type 1 calls for the present interval have been processed), then the call is blocked and $NB_1$, the number of blocked type 1 calls is incremented. This count is stored in the counter 231 in FIG. 1.

If the test at decision block 440 indicates that a type 2 call (or function) is associated with the current message, then steps 450, 460 and either 470 or 468 are performed. The call is again blocked if the value of $N_2$ is less than zero ($N_2=N_2^n$ at the beginning of the interval). Upon blocking of a call or the sending of a call (call or other message, actually) of either type, processing follows path 479 in FIG. 4 to a test at block 480 to determine whether the current 1-second period has expired. If the period has expired, then a new set of values for $N_1^n$ and $N_2^n$ are used for further processing of received messages. Conveniently, the number of blocked calls of types 1 and 2 are revealed in the magnitude of any negative values for N1 and N2, respectively, at the end of a 1-second period.

It should be understood that the above-described methods and apparatus combinations are merely illustrative. Other particular methods and circuit arrangements in accordance with the inventive principles of the present invention may be used to effect any of the described operations and combinations of them.

In one modifications of the above teachings, the delay encountered by messages of each different type is separately measured and compared with a respective objective delay for each 1-second interval. Then, when one or more of the delays exceeds its respective objective delay adjustments are made in the number of messages of each type to be sent to the processor, with the result that messages are selectively blocked. As before, the number of blocked messages is typically used in determining the number of messages to be allowed. In the case where delays are separately measured for each type of message, greater flexibility is available in setting these numbers.

Further, the number of messages of each type to be allowed will reflect the nature of the messages (for example, in respect of priority), thereby correspondingly affecting the blocking of messages in a related manner. Considerable flexibility is available in respect of the priorities (or other weights) accorded messages of each type, and for remedial action taken when particular objectives are exceeded. Assignments of weights or priorities for messages of each type (and the remedial action to be affected when respective objectives are exceeded) can be set independently of other types of messages. Alternatively, treatment to be accorded some kinds of messages can be coordinated, e.g., by receiving related adjustments in number of non-blocked messages during each 1-second interval. It may prove appropriate in some cases to seek to avoid delays for certain kinds of messages even when a corresponding large increase in delay or high incidence of blocking for other kinds of messages may be experienced.

Many ways of apportioning processor capacity in a manner consistent with the present teachings will appear to those skilled in the art.

What is claimed is:

1. At a first network node, a method for controlling the delivery of a plurality M of different types of messages, each type of said message pertaining to a request for a corresponding quality of processor resources, said method comprising the step of determining the delay encountered by said messages in gaining access to said processor resources, when said delay exceeds a predetermined threshold, determining a total number of messages, $N^n$, to be delivered to said processor in an nth 1-second interval, said total number of messages comprising a number of messages $N_i^n$ corresponding to the ith type of messages, for i=1, 2, . . . , M, for each type of message, i, blocking delivery of messages in excess of said $N_i^n$, which messages become available for presentation to said processor during said nth interval.

2. The method of claim 1 further comprising the steps of determining $NB_i^n$, the number of messages of type i that are blocked during the nth time interval, and adjusting $N_i^n$ for the (n+1)th interval based on said number of blocked messages and said delay encountered by said messages.

3. The method of claim 1 wherein said determining delay encountered by said messages comprises determining a function of delay for messages received over a plurality of said 1-second intervals.

4. The method of claim 3 wherein said determining delay encountered by said messages comprises determining an average of delay for messages received over a plurality of said 1-second intervals.

5. The method of claim 1 wherein said determining a total number of messages, $N^n$, to be delivered to said processor in an nth 1-second interval, comprises determining a function of $N^n$ over a plurality of said 1-second intervals.

6. The method of claim 1 wherein said determining a total number of messages, $N^n$, to be delivered to said processor in an nth 1-second interval, comprises determining an average of $N^n$ over plurality of said 1-second intervals.

7. The method of claim 6 wherein said determining a number of messages of type i, $N_i^n$, to be delivered to said processor in an nth 1-second interval, comprises determining a function of $N_i^n$ over a plurality of said 1-second intervals.

8. The method of claim 7 wherein said determining a number of messages of type i, $N_i^n$, to be delivered to said processor in an nth 1-second interval, comprises determining an average of $N_i^n$ over a plurality of said 1-second intervals.

9. The method of claim 1 further comprising the step of sending messages from said first node to other nodes in a network, said messages indicating that messages sent to said first node have not been granted access to said processor resources.

10. The method of claim 1 further comprising the step of sending at least one message from said first node to a network management node for use by said network management node in imposing call control measures on a network including said first node.

11. The method of claim 1 further comprising the step of sending at least one message from said first node to a network management node in a network, said message(s) indicating that messages sent to said first node have not been granted access to said processor resources.

12. The method of claim 10 further comprising the step of sending a message from said network management node to one or more nodes in a network other than said first node, said message imposing a restriction on messages sent by said one or more nodes.

13. The method of claim 12 wherein said one or more message(s) sent by said network management node imposes restriction on sending messages to said first node.

14. The method of claim 1 wherein said total number of messages for the (n+1)th 1-second interval is decreased relative to $N^n$ when the delay for the nth interval exceeds said predetermined threshold.

15. The method of claim 1 wherein said total number of messages for the (n+1)th 1-second interval is increased relative to $N^n$ when the delay for the nth interval is less than said predetermined threshold.

16. The method of claim 1 wherein said total number of messages for the (n+1)th 1-second interval is equal to $N^n$ when the delay for the nth interval is equal to said predetermined threshold.

17. The method of claim 11 further comprising the step of receiving one or more control messages at said first node, said control messages indicating the number of messages intended for said first node that have been blocked at one or more network nodes.

18. The method of claim 17 wherein said receiving of one or more control messages comprises receiving at least one message from said network management node.

19. The method of claim 17 wherein said receiving of one or more control messages comprises receiving at least one message from nodes other than said network management node.

20. The method of claim 1 wherein said determining of said delay encountered by said messages comprises determining a function of delay for each type of message, i, for a respective time interval, l.

21. The method of claim 20 wherein said determining delay encountered by said messages of type i comprises determining an average of delay for messages of type i received over a plurality of said 1-second intervals.

22. The method of claim 20 further comprising the step of determining $N_i^n$ based on said number of blocked messages and said delay for messages of type i.

* * * * *